US00RE35735E

United States Patent [19]

Douty et al.

[11] E Patent Number: Re. 35,735

[45] Reissued Date of Patent: Feb. 17, 1998

[54] CONNECTOR WITH BARBED BOARDLOCK

[75] Inventors: George Harold Douty, Mifflintown; David James Fabian, Mount Joy; Joseph Robert Reagan, Harrisburg, all of Pa.

[73] Assignee: The Whitaker Corporation, Wilmington, Del.

[21] Appl. No.: 198,387

[22] Filed: Feb. 18, 1994

Related U.S. Patent Documents

Reissue of:

[64] Patent No.: 4,907,987
Issued: Mar. 13, 1990
Appl. No.: 265,790
Filed: Nov. 4, 1988

U.S. Applications:

[63] Continuation of Ser. No. 850,733, Mar. 13, 1992, abandoned.

[51] Int. Cl.[6] ..... H01R 13/74

[52] U.S. Cl. ..... 439/571; 439/555

[58] Field of Search ..... 439/68, 76, 82–89, 439/555–557, 565–567, 571, 572, 751

[56] References Cited

U.S. PATENT DOCUMENTS

| | | | |
|---|---|---|---|
| 3,213,189 | 10/1965 | Mitchell et al. . | |
| 3,777,052 | 12/1973 | Fegen . | |
| 3,910,663 | 10/1975 | Winger | 439/82 |
| 3,977,075 | 8/1976 | Lynch et al. . | |
| 4,142,810 | 3/1979 | Lesaint . | |
| 4,205,889 | 6/1980 | Rieman . | |
| 4,420,882 | 12/1983 | Ritchie et al. . | |
| 4,435,031 | 3/1984 | Black et al. | 339/17 |
| 4,457,573 | 7/1984 | Bailey et al. . | |
| 4,461,537 | 7/1984 | Raymer et al. | 350/96 |
| 4,477,142 | 10/1984 | Cooper et al. | 339/125 |
| 4,639,066 | 1/1987 | Shimamiya et al. | 339/132 |
| 4,665,517 | 5/1987 | Bryce | 439/57 |
| 4,679,883 | 7/1987 | Assini et al. | 439/607 |
| 4,681,389 | 7/1987 | Nakazawa et al. | 439/557 |
| 4,693,532 | 9/1987 | Colleran et al. | 439/594 |
| 4,717,219 | 1/1988 | Frantz | 439/82 |
| 4,721,473 | 1/1988 | Del Guidice | 439/79 |
| 4,735,587 | 4/1988 | Kirayoglu | 439/751 |
| 4,766,652 | 8/1988 | Sugiura . | |
| 4,938,704 | 7/1990 | Fujiura | 439/95 |

FOREIGN PATENT DOCUMENTS

| | | |
|---|---|---|
| 0180284 | 10/1985 | European Pat. Off. . |
| 2386963 | 11/1978 | France . |
| 18 10 513 | 11/1977 | Germany . |
| 7914042 | 8/1979 | Germany . |
| 63-172071 | 8/1988 | Japan . |
| 1224525 | 3/1971 | United Kingdom . |
| 2058485 | 4/1981 | United Kingdom . |

OTHER PUBLICATIONS

Miniature Pluggable Contacts, IBM Technical Disclosure Bulletin, vol. 5, No. 5, Oct. 1962.

*Primary Examiner*—Gary F. Paumen

[57] ABSTRACT

An electrical connector (20) for mounting to a printed circuit board (24) includes a boardlock (22) secured thereto by an interference fit. The boardlock (22) has a first portion (58) including means for securing the boardlock (22) to the connector housing (26) and a second portion (68). The second portion (68) comprises spring means (72,74) extending from the first portion (58) to an end (80) beyond the mounting face (30) for reception in a boardlock receiving aperture (56) in the printed circuit board (24). The spring means (72,74) have a slot (70) therebetween and barb means (84) thereon with the barb means (84) positioned along the spring means (72,74) between the first portion (58) and the end (80) to engage wall means (92) of the boardlock receiving aperture (56).

39 Claims, 17 Drawing Sheets

CONNECTOR WITH BARBED BOARDLOCK

Matter enclosed in heavy brackets [ ] appears in the original patent but forms no part of this reissue specification; matter printed in italics indicates the additions made by reissue.

*This is a continuation application of application Ser. No. 07/850,733 filed Mar. 13, 1992, now abandoned.*

BACKGROUND OF THE INVENTION

This to an electrical connector and in particular to an electrical connector having integral means for securing the connector to a printed circuit board.

Apparatus exists for providing electrical connectors with integral means for being secured to a printed circuit board. One such apparatus is disclosed in U.S. Pat. No. 4,679,883 in which a shoulder eyelet having a flange and a generally tubular shank is closely received in an aperture in a connector housing. The eyelet is frictionally disposed in the aperture with an interference fit therebetween and has a tubular shank extending beyond the mounting face of the connector. The eyelets are aligned with respective preformed holes in a printed circuit board and with the connector received on the printed circuit board, the ends of the shanks extend through the printed circuit board and may be rolled or soldered to secure the connector to the printed circuit board.

Another apparatus is disclosed in European Patent Application No. 0180284 wherein a ground strap integral with a drawn shell includes resilient tines which deflect toward each other during insertion into apertures in a printed circuit board, then spring back to their initial spacing to cause shoulders to extend under the lower surface of the printed circuit board, thereby securing the connector to the printed circuit board.

Another apparatus is disclosed in U.S. Pat. No. 4,717,219 wherein an inverted end eyelet is frictionally disposed in an aperture in a mounting flange of a connector. With the connector received on a printed circuit board and the eyelet passing through an aperture therein, the inverted end is splayed or expanded by activation through a bore in the tubular shank to secure the electrical connector to the printed circuit board

SUMMARY OF THE INVENTION

In accordance with the present invention, an electrical connector for mounting to a printed circuit board includes a dielectric housing having an integral flange having a mounting face, an opposed holding face, and aperture extending therebetween. A first portion of the boardlock is disposed in the aperture in an interference fit. A second portion of the boardlock comprises spring means extending from the first portion to an end beyond the mounting face. The springs means have barb means thereon, positioned along the spring means between the first portion and the end. The barbs extend laterally from the spring means such that when the second portion of the boardlock is received in a boardlock receiving aperture in a printed circuit board, the barb means engage the wall of the boardlock receiving aperture to secure the connector to the printed circuit board.

DESCRIPTION OF THE PREFERRED EMBODIMENT

Figure 1:
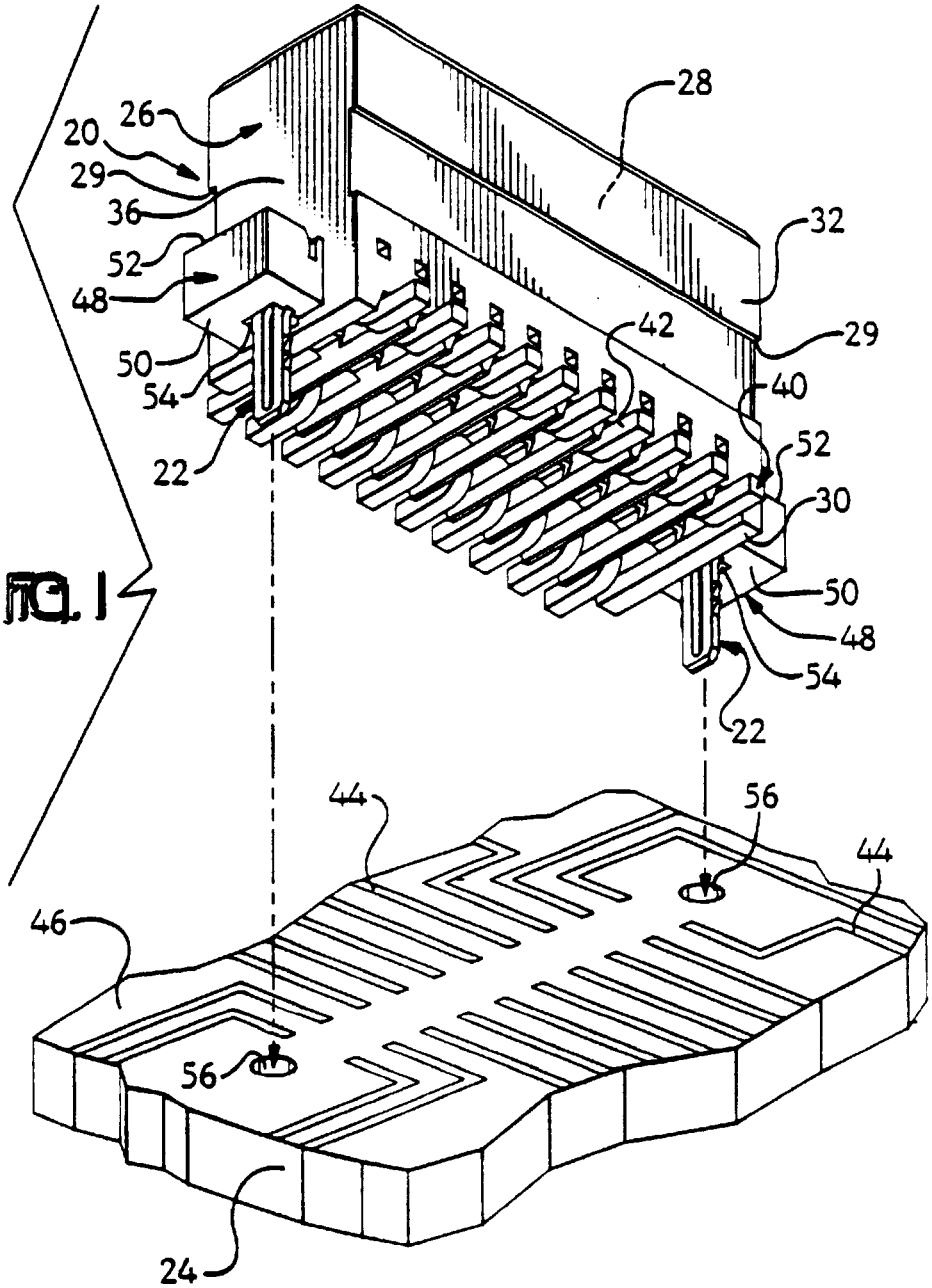
FIG. 1 is a perspective view of a surface mount connector, including a boardlock in accordance with the present invention exploded from a printed circuit board.

FIG. 1 is a perspective view of a surface mount connector 20, including a boardlock 22 in accordance with the present invention, exploded from a printed circuit board 24. Connector 20 has a housing 26 molded of thermoplastic having a mating face 28, an opposed mounting face 30, opposed side walls 32, 34 and opposed end walls 36, 38. Connector 20 has terminal receiving passages extending from mating face 28 to mounting face 30, with terminals 40 secured therein. Terminals 40 are typically for surface mount termination to interconnect the solder tail portion 42 of terminal 40 to traces 44 on upper surface 46 of printed circuit board 24. Terminals 40 may be any known terminal, including both pins or sockets, such as the terminals disclosed in U.S. Pat. Nos. 4,693,528 or 4,695,106, the disclosures of which are hereby incorporated by reference. Connector 20 may have a pair of mounting flanges 48 having a recess or aperture 54 therein for receiving boardlock 22. The holding face 52 of flanges 48 are coplanar for reception against printed circuit board 24, and may have standoffs for cleaning under connector 20 after a soldering operation.

Figure 2:
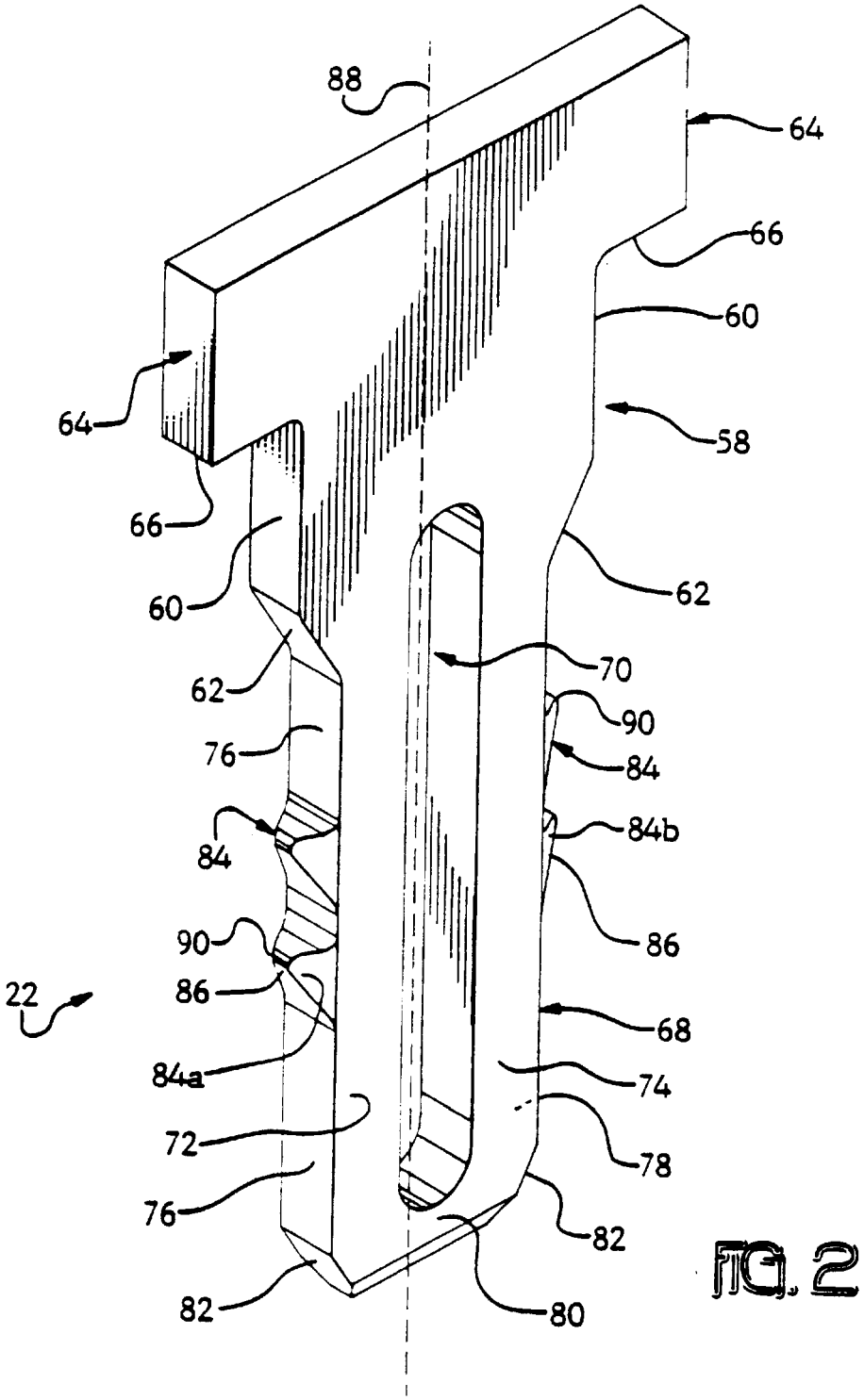
FIG. 2 is an enlarged perspective view of a boardlock shown in FIG. 1.

As best seen in FIG. 2, planar boardlock 22 is stamped from flat stock, typically a heat treated steel, then plated to enhance solder wetting. Boardlock 22 has a first portion 58 adapted to be received in aperture 54 in an interference fit. Typically the width of first portion 58 between sheared surfaces 60 is slightly larger than the width of aperture 54 such that upon insertion of boardlock 22 into aperture 54, tapered edges 62 plow through the housing material peripheral to aperture 54 providing an interference fit retention. Tabs 64 extend from first portion 58 and extend laterally beyond first surfaces 60 defining shoulders 66 that engage holding face 52 to secure connector 20 against surface 46. Tabs 64 thus provide means for preventing housing 20 from being separated from boardlock 22.

Second portion 68 extends from first portion 58 and has elongate slot 70 defining spring members 72, 74. *The spring members 72, 74 extend from the first portion 58 and are interconnected by a first interconnection integral within the first portion 58.* The width of second portion 68 as defined by outer sheared surfaces 76, 78 is typically less than the width of first portion 58, as defined by surfaces 60, 62 and typically less than the width of boardlock receiving apertures 56 in printed circuit board 24. *The outer surface of the first portion 58 may define the surface 62 as a tapered surface which merges into the outer surface of the spring members 72,74.* Spring members 72, 74 extend to, rejoin and form closed end 80 beyond mounting face 50. Closed end 80 may have tapered surfaces 82 to facilitate insertion into aperture 54 and boardlock receiving aperture 56.

Along spring members 70, 72 on sheared surfaces 76, 78, boardlock 22 has barbs 84 extending laterally beyond the width of second portion 68 as defined by surfaces 76, 78. Barbs 84 have a tapered surface 86 which is angled toward the centerline 88 of boardlock 22 in the direction from first portion 58 to end 80; tapered surface 86 extends to tip 90. Typically barbs 84 are spaced in pairs laterally opposite each other such that a barb 84a on one spring member, 70, is laterally opposite a barb 84b on the other spring member, 72. The tips 90 of barbs 84a, 84b *are "coined" as the tips 84a,84b* define a width that is greater than the width of boardlock receiving aperture 56.

Figure 3:
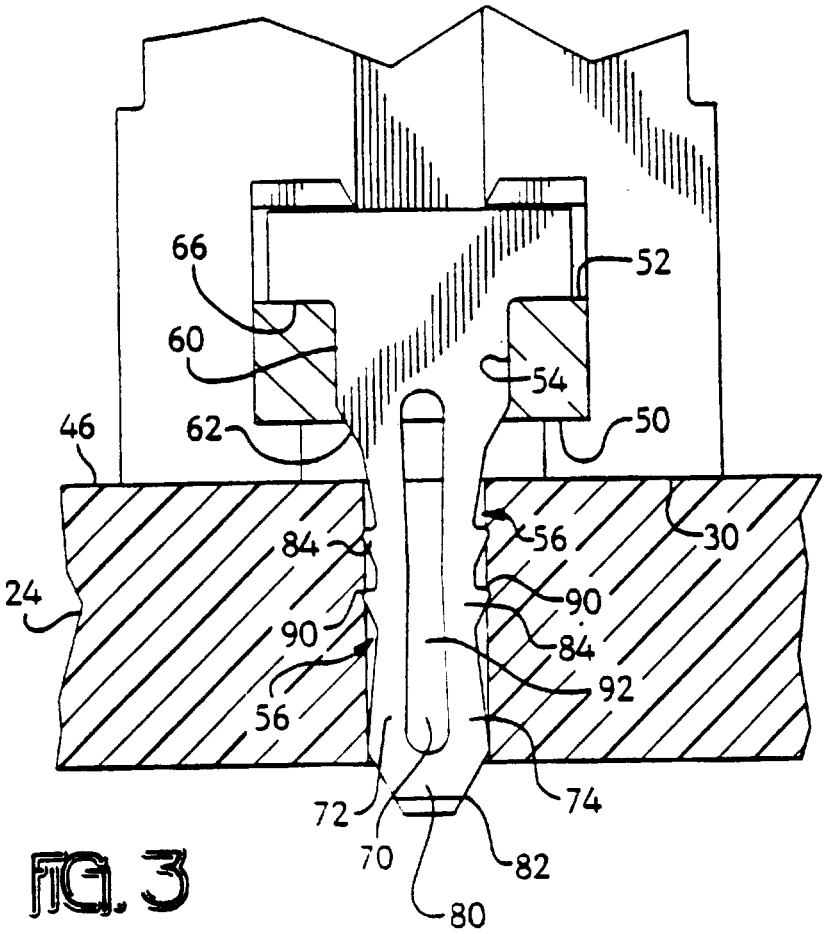
FIG. 3 is an end view, partially in section, of a boardlock secured in an aperture of the mounting flange of a connector with the connector mounted on a printed circuit board.

Barbs 84 are spaced along spring members 70, 72 in the region of elongate slot 70. As best seen in FIG. 3, barbs 84 are positioned to engage the wall 92 of boardlock receiving apertures 56 upon mounting connector 20 on printed circuit board 24.

Boardlocks 22 are inserted into boardlock receiving apertures 56 of connector 20 until shoulders 66 engage holding face 52. Connector 20 is subsequently positioned over printed circuit board 24, typically robotically, with the centerline 88 of boardlocks 22 and hence the axis of apertures 54, aligned with the axis of apertures 56. Connector 20 is then moved toward printed circuit board 24 until second portion 68 is received in boardlock receiving aperture 56 facilitated by tapered surfaces 82. As connector 20 is moved closer to printed circuit board 24, barbs 84 begin to enter aperture 56. A reaction, due to the relative motion of the connector toward printed circuit board 24, at the periphery of aperture 56, causes inward deflection of spring members 72, 74 as tapered surfaces 86 ride up the periphery of aperture 56 at upper surface 46. Barbs 84 enter aperture 56 with barbs 84, and specifically tips 90, biting into wall 92. An insertion force is thus required to cause boardlock 22 to pass into boardlock receiving aperture 56. The movement of connector 20 toward surface 46 continues until mounting face 30 engages surface 46. In this manner, barbs 84 engage wall 92 in an interference fit, typically half way through the thickness of the printed circuit board to secure boardlock 22 and hence connector 20 to printed circuit board 24 as show, in FIG. 3. Boardlock 22 is preferably backed by tooling during insertion into aperture 56 to assure that boardlock 22 does not back out of aperture 54.

Figure 4:
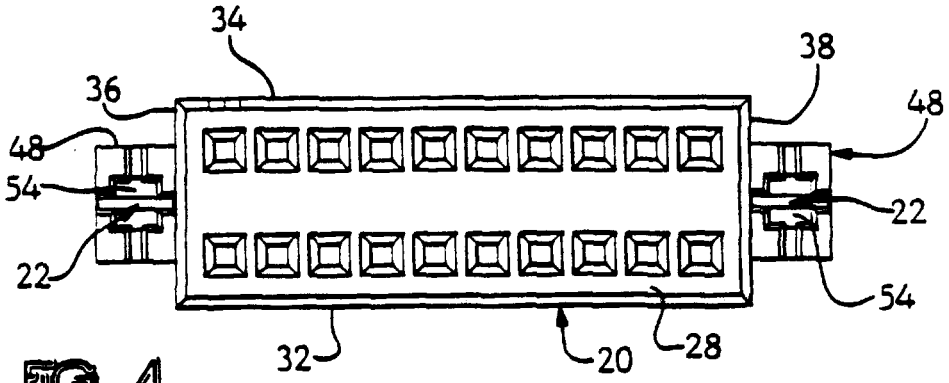
FIG. 4 is a top view of a connector mounted on a printed circuit board with the boardlocks aligned with the major length of the connector housing.

FIGS. 1 and 3 show boardlocks 22 received in aperture 54 such that the plane of boardlock 22 is parallel to the width of connector housing 26. FIG. 1 further shows two boardlocks 22 the planes of which are parallel. The plane of the boardlocks is not required to be parallel to the width of the connector housing 26 or parallel to each other when two boardlocks are present. FIG. 4 shows a connector having two boardlocks 22 wherein the plane of the boardlocks is parallel to a plane passing through the axes of apertures 54.

Figure 5:
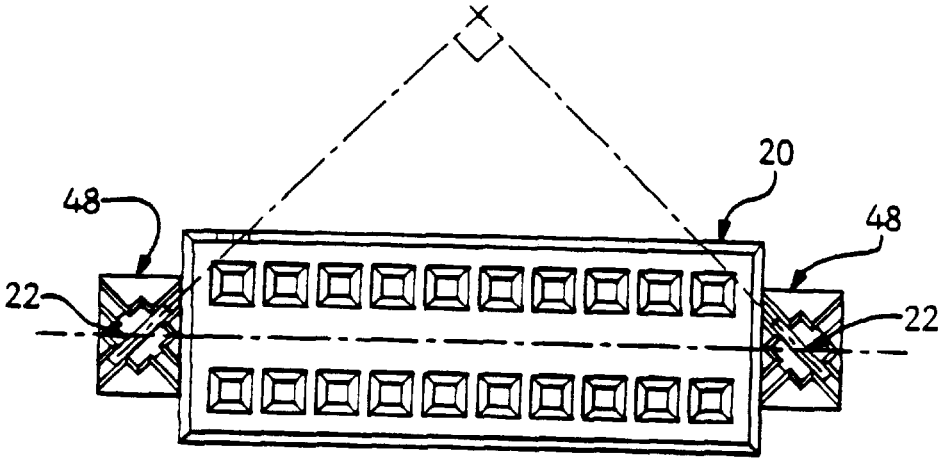
FIG. 5 is a top view of a connector mounted on a printed circuit board with the boardlocks in a preferred orientated at a right angle with respect to each other.

Since boardlocks 22 are planar, errors in positioning connector 20, and thus the solder tail portion 42 of terminals 40 relative to traces 44 can be significant. Position errors can be reduced by orienting the plane of boardlocks 22 to be perpendicular to each other. Position errors can be minimized by further orienting the plane of each boardlock 22 in connector 20 to a 45 degree angle with respect to a line segment drawn through the axis of apertures 54 in which boardlocks 22 are secured in connector 20, as is shown in FIG. 5.

Figure 6:
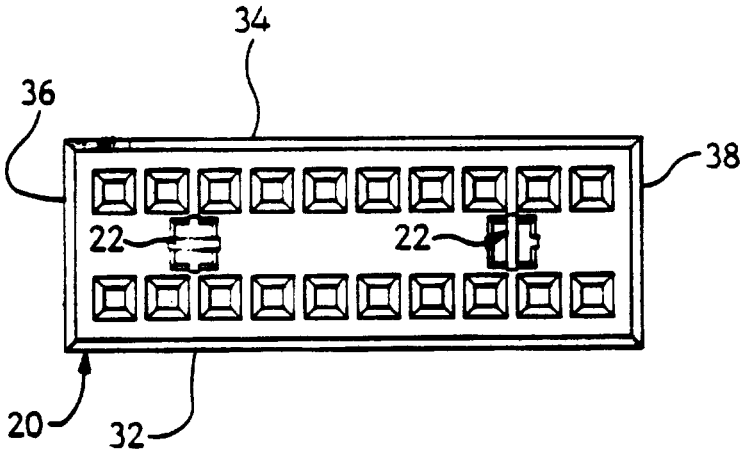
FIG. 6 shows a top view of a connector similar to FIG. 4, with the boardlocks located between rows of contacts.

As best seen in FIG. 6, boardlocks 22 and apertures 54 may be placed between terminals 40 thereby obviating the need for flanges 48. The plane of boardlock 22 may be parallel to a row of terminals 40 or perpendicular thereto.

Figure 7:
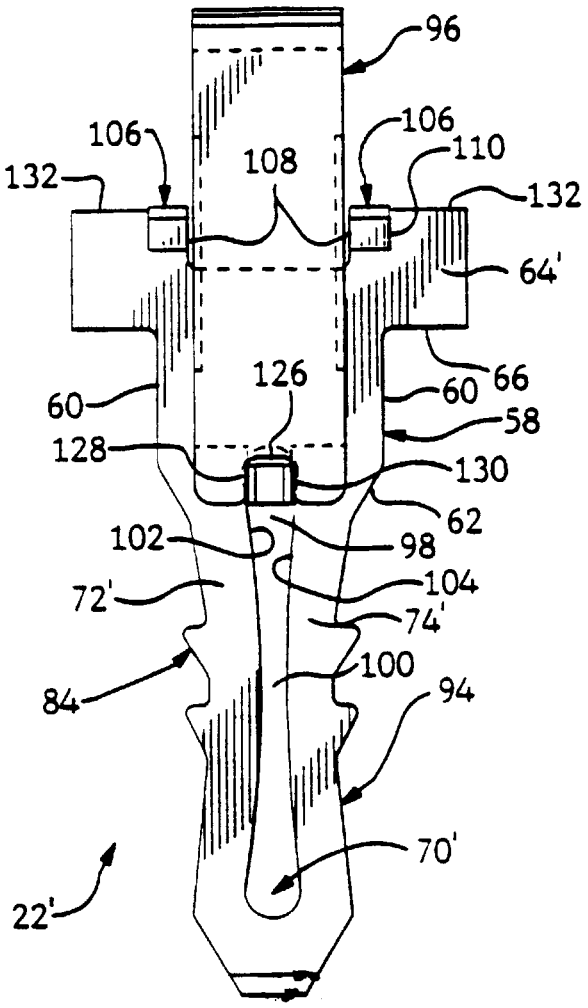
FIG. 7 is an enlarged front view of an alternate embodiment boardlock.
Figure 8:
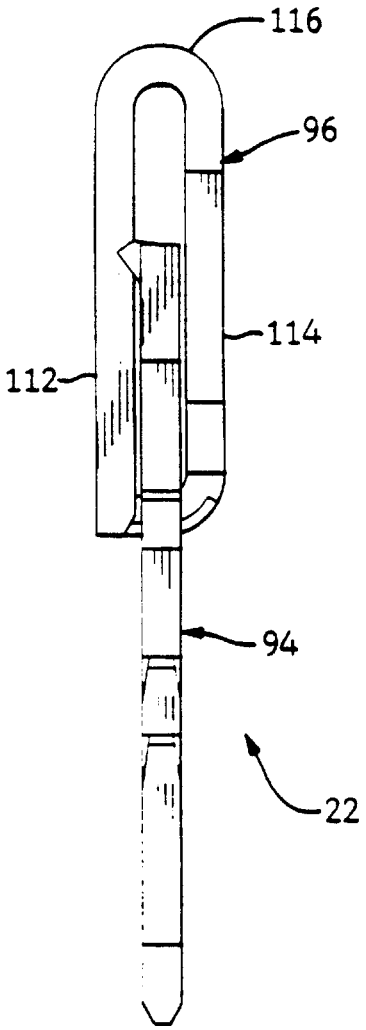
FIG. 8 is an enlarged side view of the alternate embodiment boardlock of FIG. 7.

An alternate embodiment boardlock is shown in FIGS. 7–13. Alternate embodiment boardlock 22' is comprised of two parts, member 94 and activating clip 96. FIG. 7 shows a front view of boardlock 22'; FIG. 8 shows a side view of boardlock 22'. Member 94 is very similar to boardlock 22, as best seen in the perspective view of FIG. 2. Slot 70' has a wider region 98 near first portion 58 and a narrower region 100 at a distance removed from first portion 58, shown at the middle of slot 70 along centerline 88. Slot 70' defines walls 102 and 104 on spring members 72' and 74' which are spaced at a greater distance from each other in wider region 98 than in narrower region 100. Slot 70' takes this shape either from being stamped in this shape or from being stamped similar to slot 70 thence spring members 72 and 74 formed toward centerline 88 resulting in slot 70' and spring members 72' and 74'.

Tabs 64' have guides 106 formed therein. Guides 106 are formed out of the plane of boardlock 22' and provide a guide surface 108 along which activating slip 96 can pass. Guides 106 may be partially sheared from tabs 64' as at 110 and formed out of the plane of the boardlock in the same or opposite direction. *The outer surface of the first portion 58 may define the surface 62 as a tapered surface including a curved surface which merges into the outer surface of the spring members 72',74'.*

Figure 9:
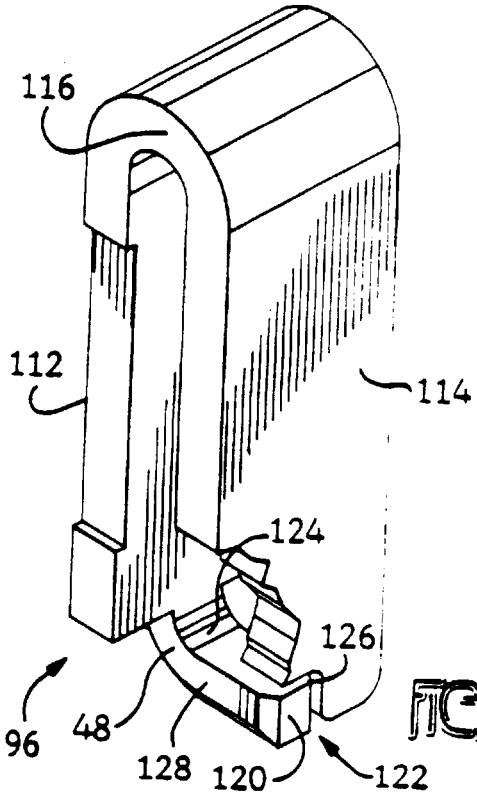
FIG. 9 is an enlarged perspective view, partially broken away, of the activating clip of the boardlock of FIG. 7.
Figure 10:
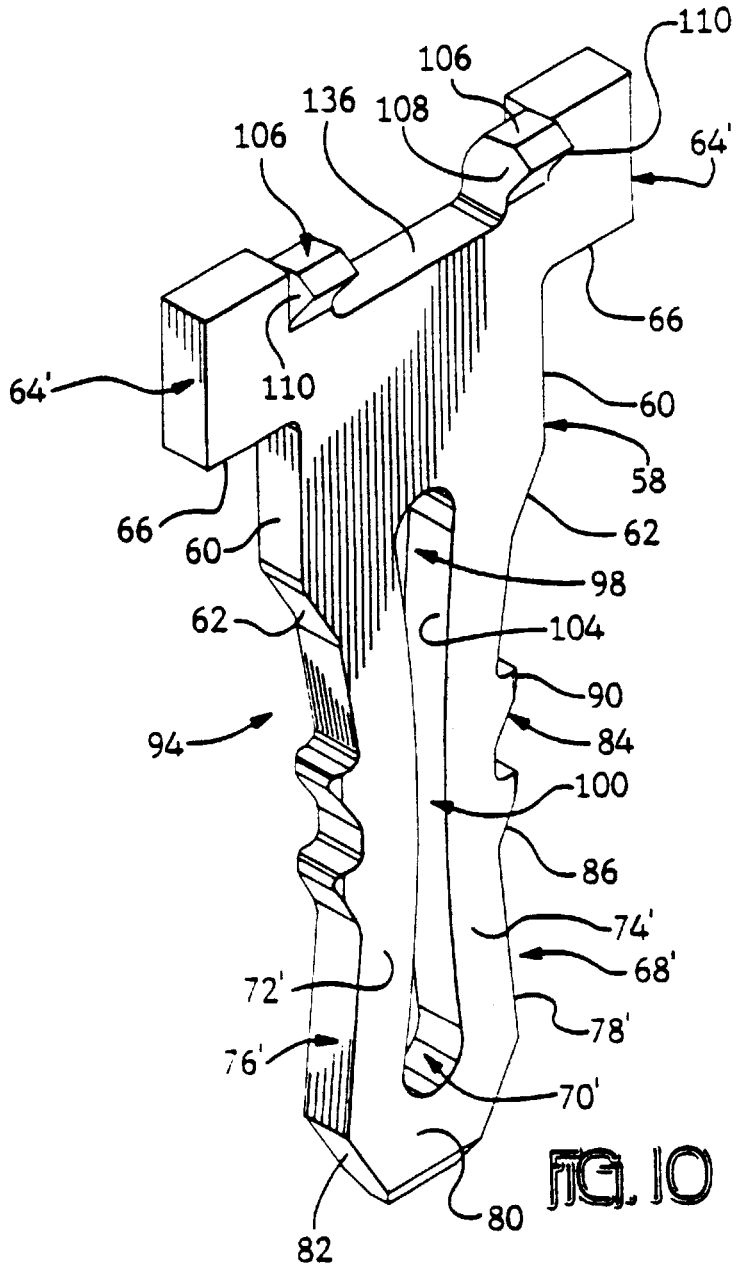
FIG. 10 is an enlarged perspective view of the lower portion of the boardlock of FIG. 7.
Figure 11:
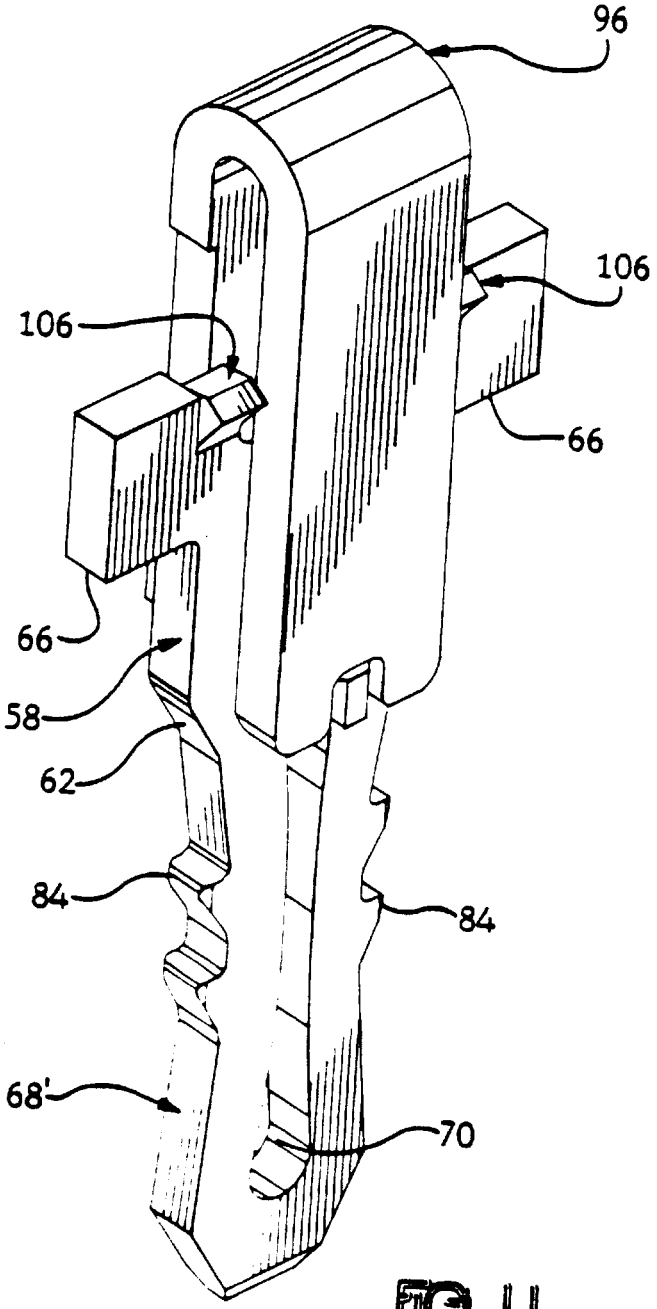
FIG. 11 is a perspective view of the alternate embodiment boardlock of FIG. 7.
Figure 12:
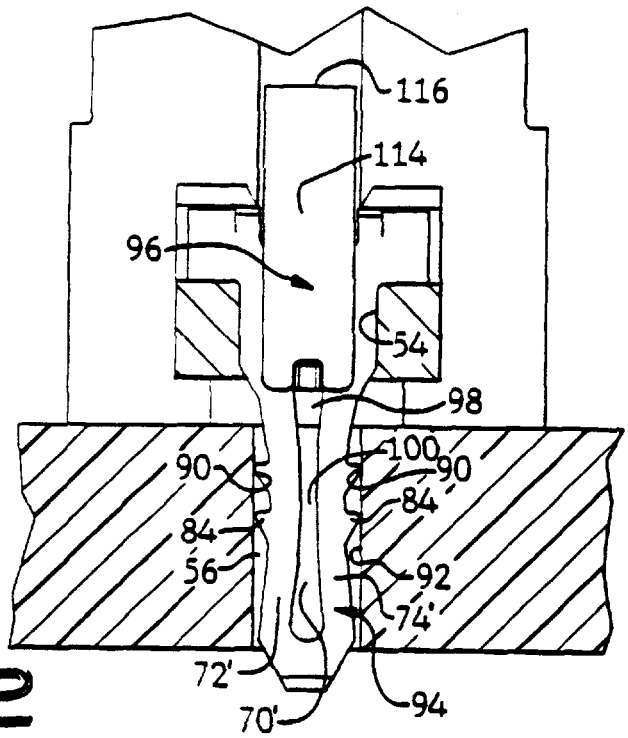
FIG. 12 is a sectional view of the alternate embodiment boardlock of FIG. 7 secured in an aperture of the mounting flange of a connector, with the connector mounted on a printed circuit board and the boardlock unactivated.

Activating clip 96 is best seen in the enlarged perspective view, partially broken away, of FIG. 9, separated from boardlock 22'. Activating clip 96 is comprised of first and second arms 112, 114 interconnected by bight 116. First and second arms 112, 114 form a U-shape and are spaced apart substantially the thickness of member 94. A portion of first arm 112 is formed across the space separating first and second arms 112, 114 and thus through slot 70, to engage second arm 114. Tab 118 is formed from the end of first arm 112 remote from bight 116. The end 120 of tab 118 is received in recess 122 in second arm 114. Upper surface 124 of end 120 engages the base 126 of recess 122 for support. The sides of tab 118 define walls 128, 130 which, in turn, define the width of tab 118. Walls 128, 130 are spaced a width that is grater than the width of narrow region 100 of slot 70', as defined by walls 102, 104, with boardlock 22' in an unactivated condition as shown in FIGS. 7, 11 and 12. Typically, the width of tab 118 is substantially the same or slightly less than the distance between walls 102, 104 in wider region 98.

With boardlock 22, formed as described above and assembled as shown in FIGS. 7 and 8, boardlock 22' is inserted into aperture 54 of connector 20 by pressing on upper surface 132 of tabs 64'. Boardlock 22' is received in aperture 54 in an interference fit, as described above with respect to boardlock 22.

Connector 20 is grasped under ledges 29 and mounted, typically robotically, to printed circuit board 24. Tapered surface 82 facilitate guiding end 80 into aperture 56. As boardlock 22, is moved into aperture 56, tips 90 of barbs 84 typically clear walls 92 of boardlock receiving aperture 56 upon insertion thereinto, resulting in a zero insertion force boardlock. The movement of connector 20 toward surface 46 continues until mounting face 30 engages surface 46. This results in the connector mounted, boardlock unactuated, condition shown in FIG. 12.

Figure 13:
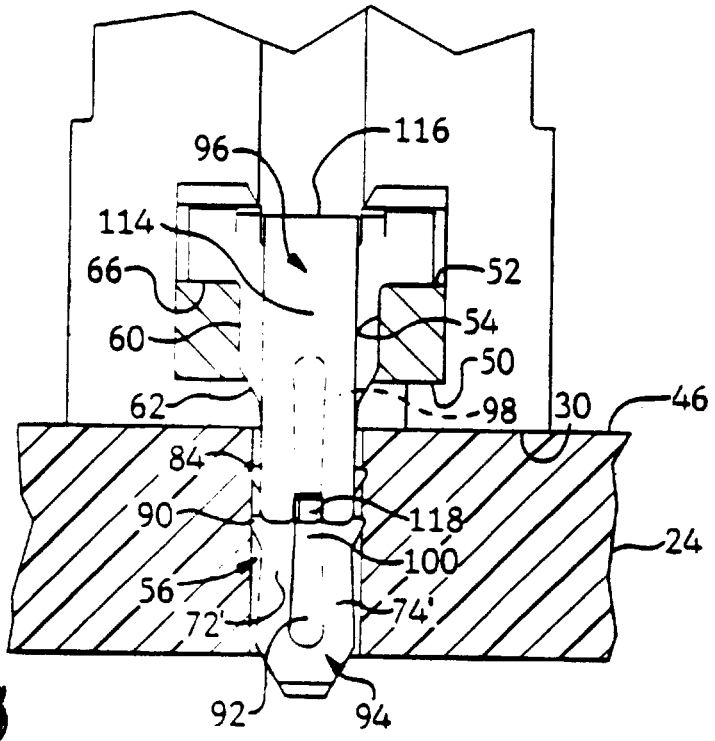
FIG. 13 is a sectional view of the alternate embodiment boardlock of FIG. 7 with the boardlock activated.

Boardlock 22 is subsequently actuated by applying a force along centerline 88 on bight 116 to cause activating clip 96 to move from the unactuated condition shown in FIG. 12 downward from the perspective of the figures, to the actuated condition shown in FIG. 13. Activating clip 96 can move along centerline 88 until the inside of bight 116 engages surface 136 between tabs 64'. First and second arms 112, 114 are received in aperture 54, as best seen in FIGS. 12 and 13.

During actuation, outer edges 134 of second arm 114 move between guide surfaces 108, the applied force is transferred to both ends of tab 118 by first and second arms 112, 114, the reaction between walls 128 and 130, and walls 102 and 104, respectively, causes spring members 72' and 74' to move laterally away from centerline 88 and toward walls 92 of aperture 56, with the result that barbs 84, and more specifically tips 90, bite into walls 92 of aperture 56 resulting in an interference fit between boardlock 22' particularly barbs 84, and walls 92 of boardlock receiving aperture 56, to secure connector 20 to printed circuit board 24. With the inside of bight 116 seated against surface 136, tab 118 remains between spring members 72' and 74' to assure that barbs 84 remain engaged with wall 92 and connector 20 remains secured to printed circuit board 24.

As activating clip 96 is moved to activate boardlock 22', tab 118 moves from wider region 98 to narrower region 100, forcing slot 70, to widen to accommodate the width of tab 118 between spring members 72' and 74', typically with walls 128, 130 engaging walls 102, 104, respectively. FIG. 13 shows boardlock 22' in an activated state. The lower portion of slot 70' clearly has widened; the upper portion, designated wider region 98, is shown in phantom and it, too, has widened.

Prior to actuating clip 96, housing 26 is grasped under ledges 29, typically by the robotic gripper that positioned connector 20 on printed circuit board 24. Actuating forces applied to activating clip 96 along centerline 88 create equal and opposite forces on housing 26. With housing 26 grasped under ledges 29, the forces of actuation and reactionary forces along centerline 88 are applied only to the boardlock, housing 26, and the robotic gripper or other tooling. There is no force along centerline 88 on printed circuit board 24 and thus no forces to disturb other components mounted on but not yet soldered to board 24.

Alternate embodiment boardlock 22' has been described as providing a zero insertion force boardlock; an interference fit could exist between barbs 84 and wall 92 upon insertion of the boardlock into aperture 56, in which case actuation of activating clip 96 would enhance retention of connector 20 on printed circuit board 24.

Figure 14:
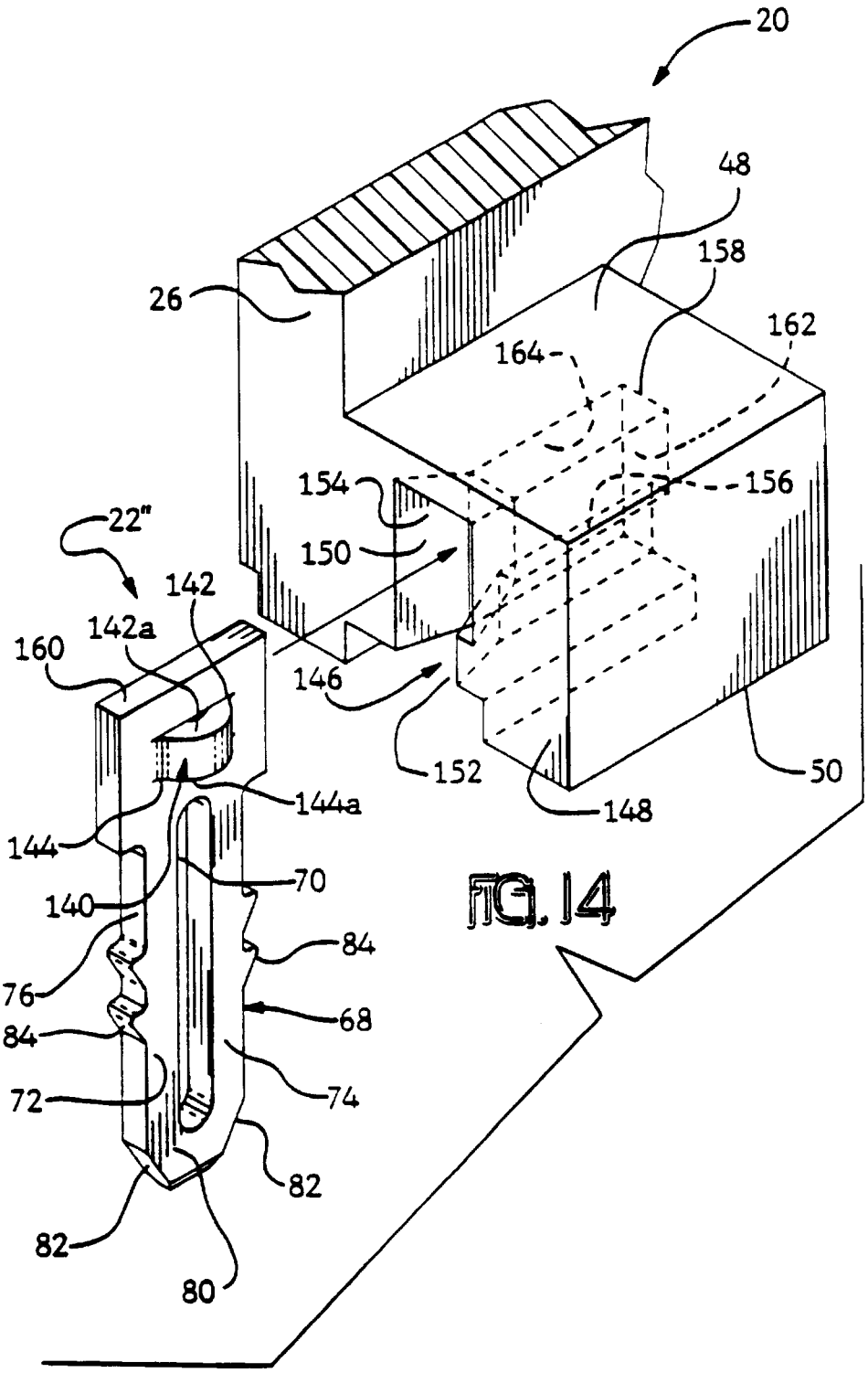
FIG. 14 is a partial perspective view of a connector flange and an alternate embodiment boardlock.

In another alternate embodiment boardlock shown exploded from housing 26 in FIG. 14, boardlock 22" has a retention feature 140 formed in first portion 58 with the retention feature extending out of the plane of the boardlock. Retention feature 140 is fabricated with a pair of sheared line segments 142, 144 transverse to centerline 88. With retention feature 140 formed out of the plane of boardlock 22", surfaces 142a and 144a define surfaces that are substantially normal to the plane of boardlock 22".

Boardlock 22" is received in lateral channel 146 in housing 26. In a preferred embodiment, channel 146 is formed in an integral mounting flange 48, opening to side 148. Channel 146 at side 148 is beveled 150 to accommodate insertion of boardlock 22". Lateral channel 146 is comprised of narrower first channel 152 opening onto mounting face 50 and extending upwardly therefrom, widening to form wider second channel 154, defining ledge 156, and terminating in channel end 158.

Boardlock 22" is moved laterally into housing 26 from side 148 with first portion 58 received in channel 146 and second portion 68 extending beyond mounting face 50. Surface 144a engages ledge 156 and top surface 160 engages channel end 158 in an interference fit to prevent boardlock 22" from falling out of channel 146. Furthermore, retention feature 140 is a spring member that presses against channel side wall 162, which, in turn, causes first portion 58 of boardlock 22" to be pressed against channel side wall 164.

As connector 20 is mounted on printed circuit board 24 and second portions 68 of boardlock 22" enter boardlock receiving apertures 56 and encounter resistance as barbs 84 engage wall 92, top surface 160 engages channel end 158 to press boardlock 22" into aperture 56 until mounting face 30 seats against printed circuit board 24 thereby obviating the need for backup tooling. With barbs 84 securing boardlock 22" to printed circuit board 24, surface 144a engaging ledge 156 to secure connector 20 to printed circuit board 24.

Figure 15:
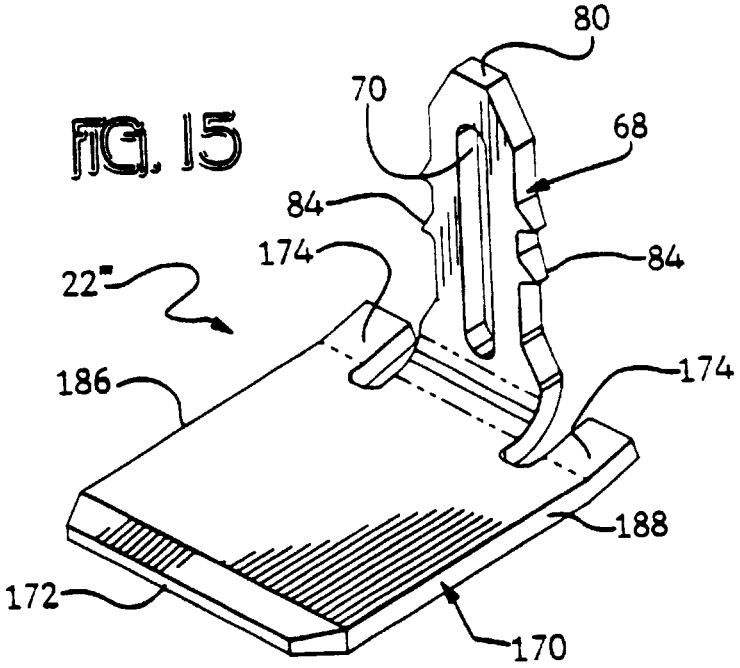
FIG. 15 is a perspective view of yet another alternate embodiment boardlock.
Figure 16:
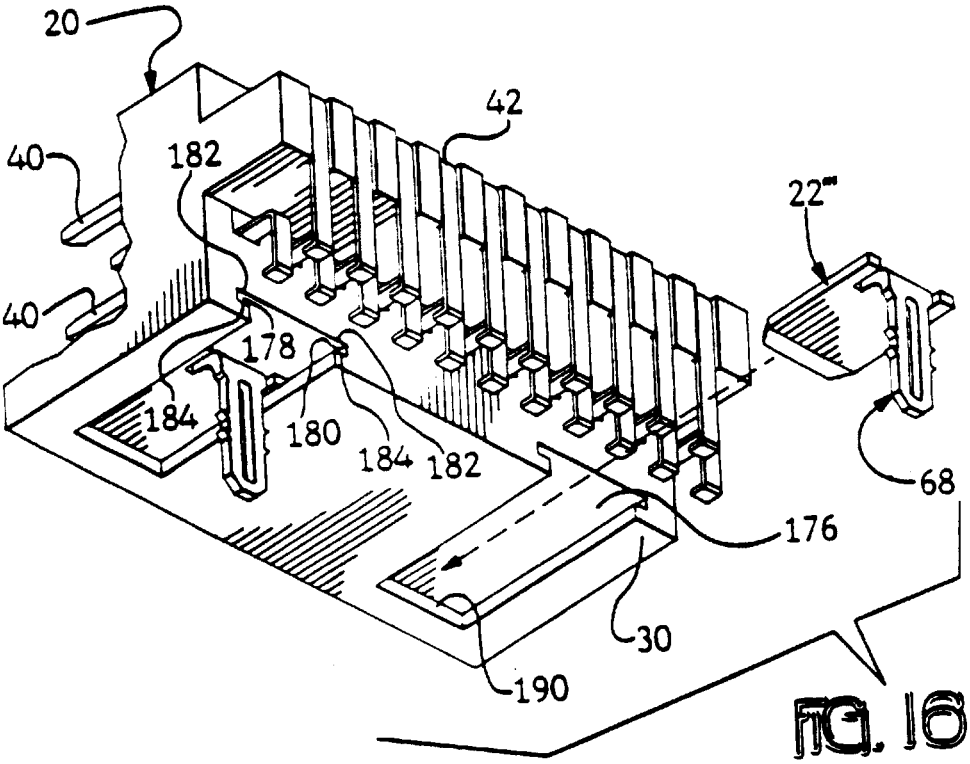
FIG. 16 is a perspective view, partially cut away, of an electrical connector employing the boardlock of FIG. 15.

Yet another alternate embodiment boardlock 22'" is shown in FIGS. 15 and 16 for right angle connectors. The first portion of the boardlock is formed into clip 170 which is tapered on its leading edge 172 to facilitate insertion. Legs 174 at the trailing edge of clip 170, relative to insertion, are deflected out of the plane of clip 170 to provide an interference fit and prevent backout.

Clip 170 is received in a clip receiving recess 176 recessed from the mounting face 30 of housing 26. Housing 26 may have one or more such clip receiving recesses 176 depending upon the number of contacts in the housing and the retention force required. Recess 176 is a T-shaped slot, including a pair of spaced channels 178, 180. Each spaced channel 178, 180 defines respectively a pair of closely spaced, opposed stop surfaces 182, 184 which extend substantially parallel to the mounting face and receive the side edges 186, 188 therebetween. Channels 178, 180 in a preferred embodiment open onto the sidewall of connector 20 adjacent the solder tail portion 42 of terminals 40.

The entrance to channels 178, 180 may be chamfered to facilitate insertion of clip 170. Clip 170 is slid into recess 176 with side edges 186, 188 received in channels 178, 180 between stop surfaces 182, 184 until leading edge 172 engages stop 190, thereby positioning clip 170 within recess 176. In this manner, second portion 68 extends beyond mounting face 30, which may have standoffs, proximate where the solder tail portion of terminals 40 to as closely as practical align the retention forces that hold the connector housing on a printed circuit board and the forces on the solder tail portion of the contacts when soldered to traces on the printed circuit board.

Figure 17:
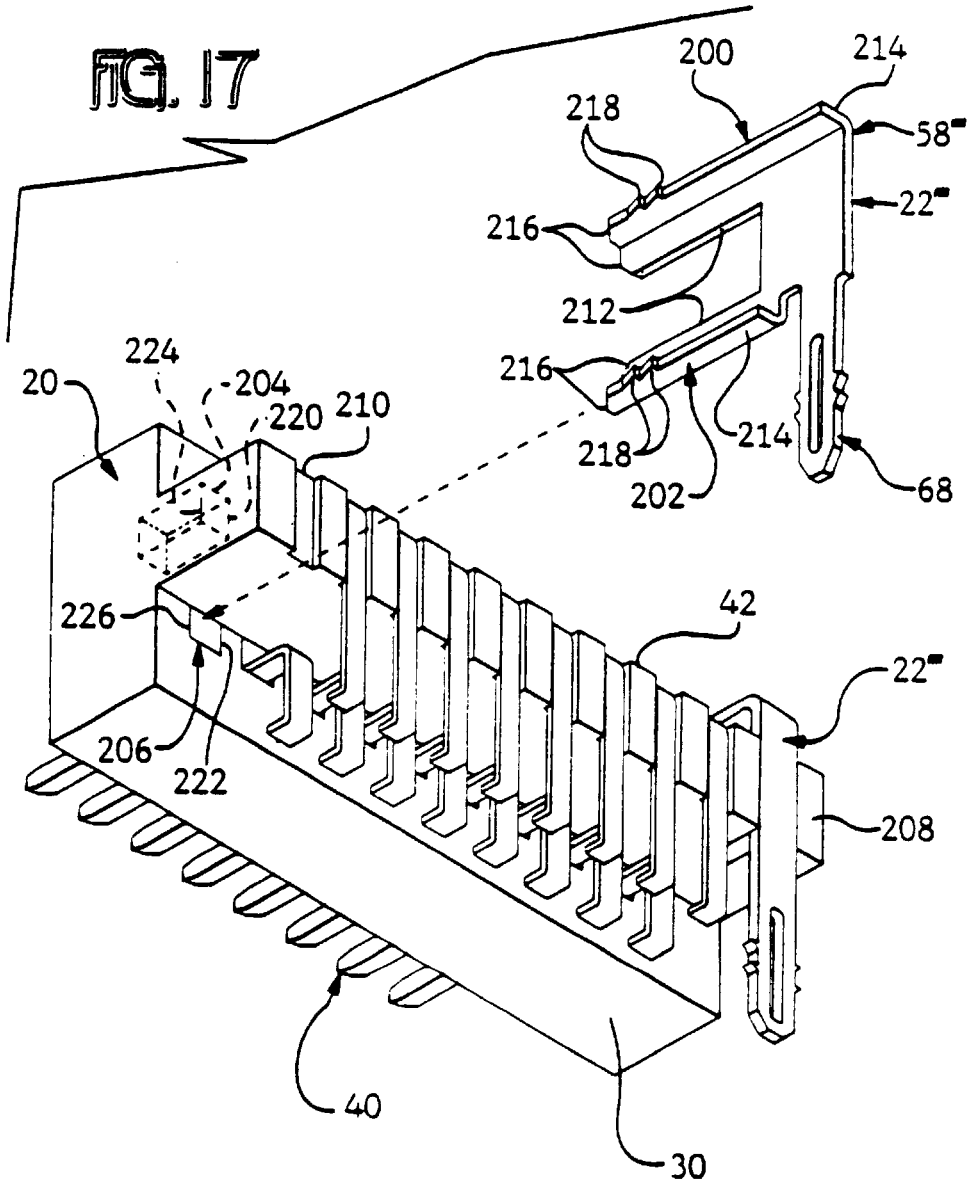
FIG. 17 is a perspective view of an electrical connector employing yet another alternate embodiment boardlock and having a boardlock exploded therefrom.

Yet another alternate embodiment boardlock 22"" is shown in FIG. 17. FIG. 17 shows connector 20 as a right angle unshrouded header having a boardlock 22"" mounted at one end and a boardlock 22"" exploded therefrom at the other end. Boardlock 22"" has a first portion that includes a pair of tabs 200, 202 that are adapted to be received in terminal receiving passages 204, 206 that do not contain terminals. The plane of second portion 68 may be parallel to tabs 200, 202 as shown in the exploded boardlock 22"" or formed to be perpendicular thereto as shown in boardlock 22"" mounted in connector 20. With tab 200 received in passage 204 above terminal bending anvil 208 and tab 202 received in passage 206 below terminal bending anvil 208, second portion 68 of boardlock 22"" extends substantially parallel to the solder tail portion 42 of terminals 40 and extends beyond mounting face 30. First portion 58"" may extend over terminal bending anvil 208 and through a terminal receiving channel 210 therein.

In a preferred embodiment, tabs 200, 202 are formed into a right angle with a vertical member 212 and a transverse member 214, both of which are tapered 216 for ease of insertion. Tabs 200, 202 are received in passages 204, 206 in an interference fit. Barbs 218 are provided on transverse members 214 to secure tabs 200, 202 in passages 204, 206 upon insertion thereinto. As tabs 200, 202 are inserted into passages 204, 206 vertical members 212 engage sidewalls 220, 222 with transverse members 214 extending across passages 204, 206 which cause barbs 218 to plow through respective sidewalls 224, 226 with plastic flowing behind the barbs to secure tabs 200, 202 in passages 204, 206 and hence secure boardlock 22"" to connector 20.

Each of the boardlocks described herein may be retained in a connector housing in any known manner, including the interference fit described. Each boardlock obviates the need for active underboard tooling and will accommodate a wide range of tolerances in both printed circuit board thickness and boardlock receiving aperture diameter, as well as different thickness of printed circuit boards.

We claim:

1. An electrical connector for mounting to a printed circuit board, comprising:

a dielectric housing having a boardlock receiving recess and a mounting face;

a boardlock disposed in said recess, said boardlock having a first portion [received] *secured* in said recess [in an interference fit], said boardlock having a second portion comprising spring means extending from said first portion to an end beyond said mounting face for reception in a boardlock receiving aperture in the printed circuit board, *the outer surface of said first portion defining tapered surfaces including curved surfaces, said tapered surfaces merging into the outer surface of said spring means,* said spring means having *a pair of springs interconnected by a first interconnection adjacent to said first portion and engaging facing surfaces of said pair of springs, and* barb means thereon positioned along the spring means between the first portion and the end to engage wall means of the boardlock receiving aperture, *said barb means having a barb tapered surface and a barb upper surface asymmetrically angled toward a centerline of the boardlock, said barb upper surface angled in the direction from the first portion to the end of said boardlock thereby defining a barb tip with said barb upper surface whereby said barb tapered surface deflects the spring means inwardly during insertion of said boardlock into said boardlock receiving aperture and said barb upper surface bites into said wall means of said boardlock receiving aperture to prevent withdrawal of said boardlock.*

2. An electrical connector as recited in claim 1 further comprising a first integral flange, said boardlock receiving recess in said flange.

3. An electrical connector as recited in claim 2 wherein said first integral flange further comprises a holding face opposed to said mounting face, and said recess is an aperture that extends between said mounting face and said holding face.

4. An electrical connector as recited in claim 3 further comprising a second flange integral with said housing, said second flange having a mounting face coplanar with the mounting face of the first flange, said second flange having an aperture therethrough with a like boardlock received therein.

5. An electrical connector as recited in claim 4 wherein the boardlocks are substantially planar.

6. An electrical connector as recited in claim 5 wherein the plane of the boardlocks are perpendicular.

7. An electrical connector [as recited in claim 6 wherein] *for mounting to a printed circuit board, comprising:*

*a dielectric housing having a boardlock receiving recess in a first integral flange, and a mounting face; said first integral flange further comprises a holding face opposed to said mounting face, and said recess is an aperture that extends between said mounting face and said holding face, a second flange integral with said housing, said second flange having a mounting face coplanar with the mounting face of the first flange,*

*a boardlock disposed in said recess, said boardlock having a first portion secured in said recess, said second flange having an aperture therethrough with a like boardlock received therein; said boardlock having a second portion comprising spring means extending from said first portion to an end beyond said mounting face for reception in a boardlock receiving aperture in the printed circuit board, said spring means having a pair of springs interconnected by a first interconnection adjacent to said first portion and engaging facing surfaces of said pair of springs, and barb means thereon positioned along the spring means between the first portion and the end to engage wall means of the boardlock receiving aperture wherein said boardlocks are substantially planar,* the plane of the boardlocks *are perpendicular and* are each at a 45 degree angle with respect to a line segment drawn through the axis of the apertures.

[8. An electrical connector as recited in claim 1 wherein said boardlock receiving recess is a lateral channel extending into said housing from a side thereof.]

[9. An electrical connector as recited in claim 1 wherein the barb means are adapted to engage wall means of the boardlock receiving aperture in an interference fit upon mounting the electrical connector on the printed circuit board.]

10. An electrical connector [as recited in claim 1, wherein] *for mounting to a printed circuit board, comprising:*

*a dielectric housing having a boardlock receiving recess, and a mounting face;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, the outer surface of said first portion defining tapered surfaces including curved surfaces, said tapered surfaces merging into the outer surface of said spring means, said spring means having a pair of springs interconnected by a first interconnection adjacent to said first portion and engaging facing surfaces of said pair of springs, and barb means thereon positioned along the spring means between the first portion and the end to engage wall means of the boardlock receiving aperture, said* [the spring means comprise a] pair of springs, *have ends that are interconnected to form a second interconnection at the ends of said boardlock* said springs defining an elongate slot [therebetween] *between said first and second interconnection.*

[11. An electrical connector as recited in claim 10 further comprising means for actuating said spring means to spread said spring means, whereby upon mounting the electrical connector to a printed circuit board and actuating the spring means actuating means, the barb means engage wall means of the boardlock receiving aperture in an interference fit to secure the connector to the printed circuit board.]

12. An electrical connector [as recited in claim 10] *for mounting to a printed circuit board, comprising:*

*a dielectric housing having a boardlock receiving recess, and a mounting face;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, said spring means having a pair of springs interconnected by a first interconnection adjacent to said first portion and engaging facing surfaces of said pair of springs, and barb means thereon positioned along the spring means between the first portion and the end to engage wall means of the boardlock receiving aperture wherein said pair of springs have ends that are interconnected to form a second interconnection at the ends of said boardlock, said springs defining an elongate slot between said first and second interconnection,* wherein said elongate slot has a wider region proximate said first portion and a narrower region proximate the end, said boardlock further comprising an activating clip having spreading means thereon, said spreading means received in said wider region and adapted to be moved toward said narrower region whereby, upon mounting the electrical connector to a printed circuit board and moving the activating clip, the barb means on the spring means engage wall means of the boardlock receiving aperture in an interference fit to secure the connector to the printed circuit board.

[13. An electrical connector as recited in claim 1 wherein the recess comprises a pair of spaced channels defining pairs of closely spaced opposed stop surfaces, said pair of spaced channels recessed from the mounting face.]

14. An electrical connection [as recited in claim 13, wherein] *for mounting to a printed circuit board, comprising:*

*a dielectric housing having a boardlock receiving recess, and a mounting face;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, the outer surface of said first portion defining tapered surfaces including curved surfaces, said tapered surfaces merging into the outer surface of said spring means, said spring means having a pair of springs interconnected by a first interconnection adjacent to said first portion and engaging facing surfaces of said pair of springs, and barb means thereon positioned along the spring means between the first portion and the end to engage wall means of the boardlock receiving aperture,, the recess comprises a pair of spaced channels defining pairs of closely spaced opposed stop surfaces, said pair of spaced channels recessed from the mounting face,* said first portion comprises a clip insertable into said recess extending between said pair of spaced channels, said clip having a pair of side edges dimensioned to be received in said pair of spaced channels and moveable therealong during insertion, the side edges of said clip being received between the opposed stop surfaces of said pair of spaced channels.

[15. An electrical connector as recited in claim 1 wherein the recess comprises a lateral channel in said housing.]

[16. An electrical connector as recited in claim 15 wherein said first portion comprises a sheared line segment with a region of said first portion adjacent said line segment formed out of the plane of the first portion to define a holding surface facing the end of said boardlock, said lateral channel having an offset facing away from said mounting face, said holding surface engaging said offset in the lateral channel to secure said boardlock in said lateral channel.]

[17. An electrical connector as recited in claim 1 wherein the recess comprises at least one contact receiving passage.]

18. An electrical connector [as recited in claim 17 further] *for mounting to a printed circuit board,* comprising:

*a dielectric housing having a boardlock receiving recess and amounting face, said recess comprising at least one contact receiving passage defined therein;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture,* a tab extending from the first portion, said tab having a barb thereon, said tab extending into [a] *the* contact receiving passage *of the boardlock receiving recess* with said barb engaging a wall of the passage to secure said boardlock to said housing.

*19. An electrical connector as recited in claim 1, wherein said curved surfaces define convex surfaces relative to the boardlock center line.*

*20. An electrical connector as recited in claim 1, wherein said curved surfaces define concave surfaces relative to the boardlock center line.*

*21. An electrical connector for mounting to a printed circuit board, comprising:*

*a dielectric housing having a boardlock receiving recess and a mounting face, said recess is a beveled lateral channel extending into said housing from a side thereof;*

*a boardlock disposed in said recess, said boardlock having a first portion secured in said recess, said beveled lateral channel disposed to accommodate the insertion of said boardlock into said recess, said first portion comprises a sheared line segment with a region of said first portion adjacent said line segment formed out of the plane of the first portion to define a holding surface facing the end of said boardlock, said lateral channel having an offset facing away from said mounting face, said holding surface engaging said offset in the lateral channel to secure said boardlock in said lateral channel, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture.*

*22. An electrical connector for mounting to a printed circuit board, comprising:*

*a dielectric housing having a boardlock receiving recess and a mounting face;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture; said spring means comprising a pair of springs having ends that are interconnected to form the ends of said boardlock, said springs defining an elongate slot therebetween; and*

*means for actuating said spring means to spread said spring means, whereby upon mounting the electric connector to a printed circuit board and actuating the spring means actuating means, the barb means engage wall means of the boardlock receiving aperture in an interference fit to secured the connector to the printed circuit board.*

*23. An electrical connector for mounting to a printed circuit board, comprising:*

*a dielectric housing having a boardlock receiving recess and a mounting face, said recess having a pair of spaced channels defining pairs of closely spaced opposed stop surfaces which extend substantially parallel to the mounting face, said pair of spaced channels recessed from the mounting face;*

*a boardlock disposed in each of said recesses, said boardlock having a first portion secured in said recess by side edges of said first portion being received in said pair of opposed stop surfaces, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture.*

*24. An electrical connector for mounting to a printed circuit board, comprising:*

*a dielectric housing having a boardlock receiving recess and a mounting face, said recess having a beveled lateral channel in said housing,*

*a boardlock disposed in said recess, said boardlock having a first portion secured in said recess, said beveled lateral channel disposed to accommodate the insertion of said boardlock into said recess, said first portion comprises a sheared line segment with a region of said first portion adjacent said line segment formed out of the plane of the first portion to define a holding surface facing the end of said boardlock, said lateral channel having an offset facing away from said mounting face, said holding surface engaging said offset in the lateral channel to secure said boardlock in said lateral channel, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture.*

*25. An electrical connector for mounting to a printed circuit board, comprising:*

*a dielectric housing having a boardlock receiving recess and a mounting face, said recess comprising at least one contact receiving passage defined therein;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, said spring means having barb means thereon positioned along the spring means between the first portion and the end to engage wall means of the boardlock receiving aperture.*

*26. A boardlock for use in mounting a dielectric housing having a boardlock receiving recess and a mounting face to a printed circuit board, comprising:*

*a first portion disposed to be secured in said recess;*

*a second portion comprising spring means extending from said first portion to an end beyond said mounting face for reception in a boardlock receiving aperture in the printed circuit board, the outer surface of said first portion defining tapered surfaces including curved surfaces, said tapered surfaces merging into the outer surface of said spring means, said spring members having a pair of springs interconnected by a first interconnection adjacent to said first portion and engaging facing surfaces of said pair of springs, and barb means thereon positioned along the spring members between the first portion and the end to engage wall means of the boardlock receiving aperture, said barb means having a barb tapered surface and a barb upper surface asymmetrically angled toward a centerline of the boardlock, said barb upper surface angled in the direction from the first portion to the end of said boardlock thereby defining a barb tip with said barb upper surface whereby said barb tapered surface deflects the spring means inwardly during insertion of said boardlock into said boardlock receiving aperture and said barb upper surface bites into said wall means of said boardlock receiving aperture to prevent withdrawal of said boardlock.*

*27. A boardlock as recited in claim 24, wherein said curved surfaces define convex surfaces relative to the boardlock center line.*

*28. A boardlock as recited in claim 26, wherein said curved surfaces define a concave surface relative the boardlock center line.*

*29. An boardlock as recited in claim 26 wherein said first portion comprises a clip insertable into a recess extending between a pair of spaced channels defining pairs of closely spaced opposed stop surfaces, said clip having a pair of side edges dimensioned to be received in said pair of spaced channels and moveable therealong during insertion, the side edges of said clip being received between the opposed stop surfaces of said pair of spaced channels.*

*30. A boardlock for use in mounting a dielectric housing having a boardlock receiving recess and a mounting face to a printed circuit board, comprising:*

*a first portion disposed to be secured in said recess;*

*a second portion comprising spring means extending from said first portion to an end beyond said mounting face for reception in a boardlock receiving aperture in the printed circuit board, said spring members having a pair of springs interconnected by a first interconnection adjacent to said first portion and engaging facing surfaces of said pair of springs, said pair of springs have ends that are interconnected to form the ends of said boardlock, said springs defining an elongate slot therebetween and barb means thereon positioned along the spring members between the first portion and the end to engage wall means of the boardlock receiving aperture.*

*31. A boardlock as recited in claim 30 further comprising means for actuating said spring means to spread said spring means, whereby upon mounting the dielectric housing to the printed circuit board and actuating the spring means actuating means, the barb means engage wall means of said aperture to secure the housing to the printed circuit board.*

*32. A boardlock as recited in claim 30 wherein said elongate slot has a wider region proximate said first portion and a narrower region proximate the end, said boardlock further comprising an activating clip having spreading means thereon, said spreading means received in said wider region and adapted to be moved toward said narrower region whereby, upon mounting the dielectric housing to a printed circuit board and moving the activating clip, the barb means on the spring means engage wall means of said aperture to secure the connector to the printed circuit board.*

*33. A boardlock for use in mounting a dielectric housing having a boardlock receiving recess and a mounting face to a printed circuit board, comprising:*

*a first portion disposed to be secured in said recess, said first portion comprises a sheared line segment with a region of said first portion adjacent said line segment formed out of the plane of the first portion to define a holding surface facing the end of said boardlock, whereby a lateral channel in said housing having an offset facing away from said mounting face enables said holding surface to engage said offset in the lateral channel to secure said boardlock in said lateral channel;*

*a second portion comprising spring means extending from said first portion to an end beyond said mounting face for reception in a boardlock receiving aperture in the printed circuit board, said spring members having a pair of springs interconnected by a first interconnection adjacent to said first portion and engaging facing surfaces of said pair of springs, and barb means thereon positioned along the spring members between the first portion and the end to engage wall means of the boardlock receiving aperture.*

*34. A boardlock for use in mounting a dielectric housing having a boardlock receiving recess including a contact receiving passage and a mounting face to a printed circuit board, comprising:*

*a first portion disposed to be secured in said recess;*

*a second portion comprising spring means extending from said first portion to an end beyond said mounting face for reception in a boardlock receiving aperture in the printed circuit board, said spring members having a pair of springs interconnected by a first interconnection adjacent to said first portion and engaging facing surfaces of said pair of springs, and barb means thereon positioned along the spring members between the first portion and the end to engage wall means of the boardlock receiving aperture, said boardlock further comprising a tab extending from the first portion, said tab having a barb thereon, said tab extending into the contact receiving passage to secure said boardlock to said housing, said barb means having a barb tapered surface and a barb upper surface asymmetrically angled toward a centerline of the boardlock, said barb upper surface angled in the direction from the first portion to the end of said boardlock thereby defining a barb tip with said barb upper surface whereby said barb tapered surface deflects the spring means inwardly during insertion of said boardlock into said boardlock receiving aperture and said barb upper surface bites into said wall means of said boardlock receiving aperture to prevent withdrawal of said boardlock.*

*35. An electrical connector for mounting to a printed circuit board, comprising:*

*a dielectric housing having a boardlock receiving recess, and a mounting face;*

*a boardlock disposed in said recess, said boardlock having a first portion secured in said recess, said boardlock having a second portion comprising spring means extending from said first portion to an end beyond said mounting face for reception in a boardlock receiving aperture in the printed circuit board, the outer surface of said first portion defining tapered surfaces including curved surfaces, said tapered surfaces merging into the outer surface of said spring means, said spring means having a pair of springs interconnected by a first interconnection adjacent to said first portion and engaging facing surfaces of said pair of springs, and barb means thereon positioned along the spring means between the first portion and the end to engage wall means of the boardlock receiving aperture, said barb means being coined to define a lesser width at a distance furthest from said boardlock centerline than the width of portions of said barb means closer to said boardlock centerline.*

*36. A boardlock for use in mounting a dielectric housing having a boardlock receiving recess and a mounting face to a printed circuit board, comprising:*

*a first portion disposed to be secured in said recess;*

*a second portion comprising spring means extending from said first portion to an end beyond said mounting face for reception in a boardlock receiving aperture in the printed circuit board, the outer surface of said first portion defining tapered surfaces including curved surfaces, said tapered surfaces merging into the outer surface of said spring means, said spring members having a pair of springs interconnected by a first interconnection adjacent to said first portion and engaging facing surfaces of said pair of springs, and barb means thereon positioned along the spring members between the first portion and the end to engage wall means of the boardlock receiving aperture, said*

*barb means being coined to define a lesser width at a distance furthest from said boardlock centerline than the width of portions of said barb means closer to said boardlock centerline.*

*37. A boardlock for use in mounting a dielectric housing having a boardlock receiving recess and a mounting face to a printed circuit board, comprising:*

*a first portion disposed to be secured in said recess;*

*a second portion comprising spring members extending from said first portion to an end beyond said mounting face for reception in a boardlock receiving aperture in the printed circuit board, said spring members having barbs thereon positioned along the spring members between the first portion and the end to engage a wall surface of the boardlock receiving aperture, said barbs define a lesser width at a distance furthest from said boardlock centerline than the width of portions of said barbs closer to said boardlock centerline.*

*38. The boardlock of claim 37, wherein said barbs have a barb tapered surface and an barb upper surface asymmetrically angled toward a centerline of the boardlock, said barb upper surface angled in the direction from the first portion to the end of said boardlock thereby defining a barb tip with said barb upper surface whereby said barb tapered surface deflects the spring members inwardly during insertion of said boardlock into said boardlock receiving aperture of said printed circuit board and said barb upper surface bites into said wall means of said boardlock receiving aperture to prevent withdrawal of said boardlock from said boardlock receiving aperture.*

*39. The invention of claim 38, wherein said barb upper surface defines a surface substantially perpendicular to said boardlock center.*

*40. The invention of claim 38 wherein an intersection of planes of said barb tapered surface and said barb upper surface define an angle less than 90°.*

*41. The invention of claim 37, in combination with a dielectric housing having a boardlock receiving recess, and a mounting face.*

*42. A boardlock for use in mounting a dielectric housing having a boardlock receiving recess and a mounting face to a printed circuit board, comprising:*

*a first portion disposed to be secured in said recess;*

*a second portion comprising spring members extending from said first portion to an end beyond said mounting face for reception in a boardlock receiving aperture in the printed circuit board, said spring members having barbs thereon positioned along the spring members between the first portion and the end to engage a wall surface of the boardlock receiving aperture, said barbs having a barb tapered surface and an barb upper surface asymmetrically angled toward a centerline of the boardlock, said barb upper surface angled in the direction from the first portion to the end of said boardlock thereby defining a barb tip with said barb upper surface whereby said barb tapered surface deflects the spring members inwardly during insertion of said boardlock into said boardlock receiving aperture of said printed circuit board and said barb upper surface bites into said wall means of said boardlock receiving aperture to prevent withdrawal of said boardlock.*

*43. The invention of claim 42, wherein said barbs define a lesser width at a distance furthest from said boardlock centerline than the width of portions of said barbs closer to said boardlock centerline.*

*44. The invention of claim 42, wherein said barb upper surface defines a surface substantially perpendicular to said boardlock center.*

*45. The invention of claim 43, wherein an intersection of planes of said barb tapered surface and said barb upper surface define an angle less than 90°.*

*46. The invention of claim 42, in combination with a dielectric housing having a boardlock receiving recess, and a mounting face.*

* * * * *

UNITED STATES PATENT AND TRADEMARK OFFICE

CERTIFICATE OF CORRECTION

PATENT NO. : Re. 35,735

DATED : February 17, 1998

INVENTOR(S) : George Harold Douty, David James Fabian, Joseph Robert Reagan

It is certified that error appears in the above-indentified patent and that said Letters Patent is hereby corrected as shown below:

In the cover page at "[75] Inventors:" after "David James Fabian, Mount Joy;" please insert --Timothy Lee Kocher, Camp Hill;--.

Signed and Sealed this

Thirtieth Day of June, 1998

*Attest:*

*Attesting Officer*

BRUCE LEHMAN

*Commissioner of Patents and Trademarks*